Sept. 20, 1949.  E. W. PETERSON ET AL  2,482,636
COATING AND MOISTENING MECHANISM
FOR DUPLICATING APPARATUS
Original Filed July 23, 1942  7 Sheets-Sheet 2

INVENTORS:
Eric W. Peterson.
John J. Camphouse
BY Zabel and Fitzbaugh
attys.

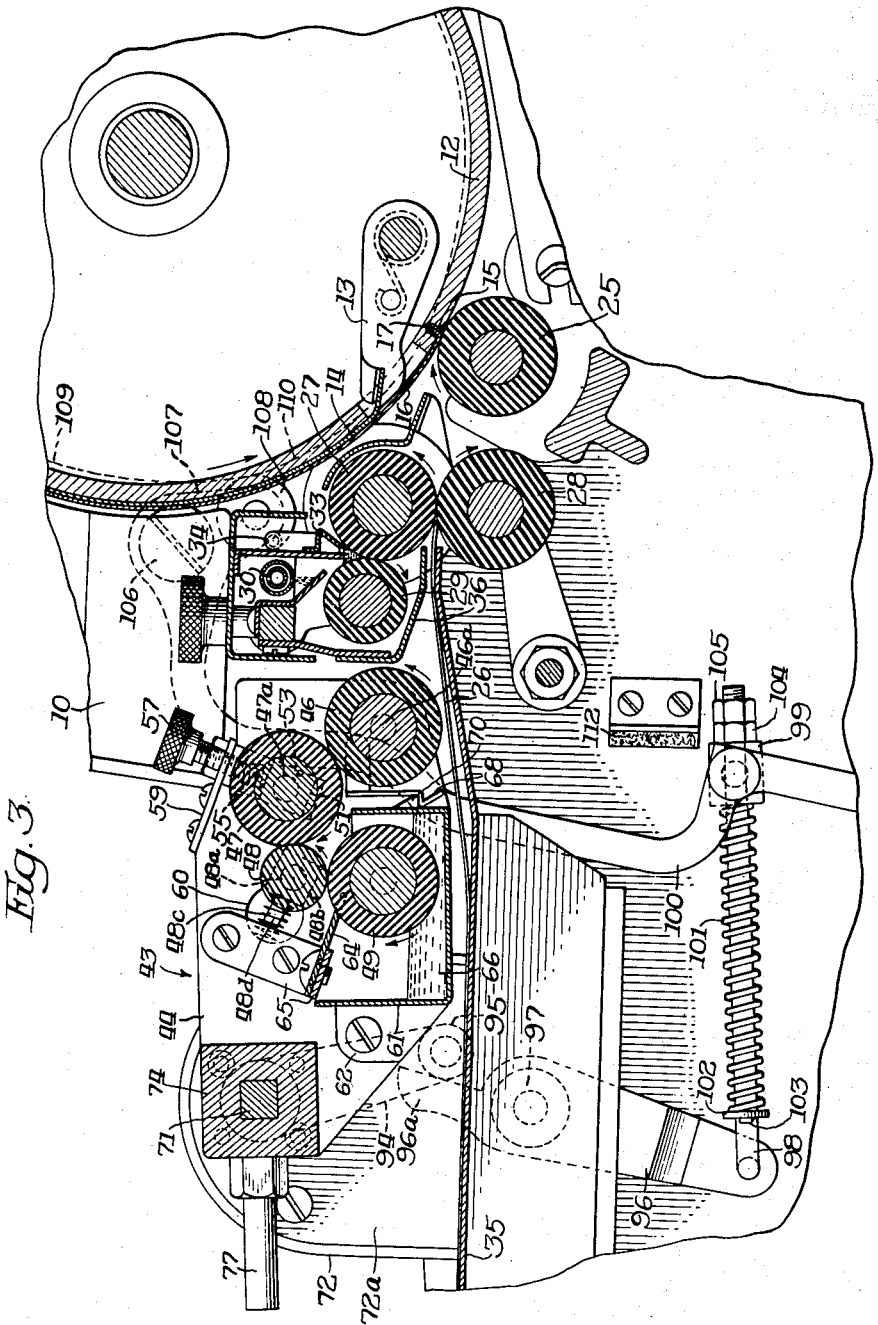

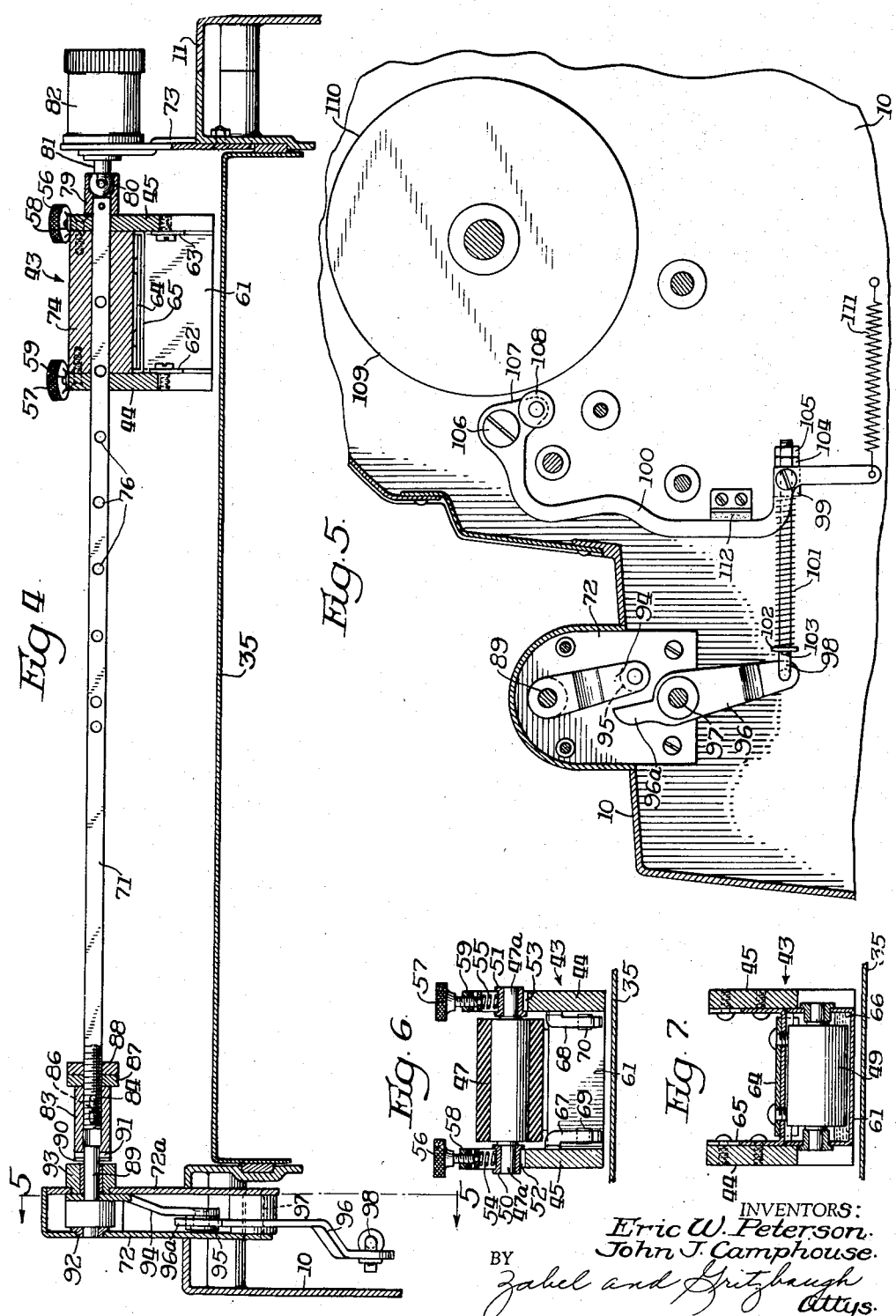

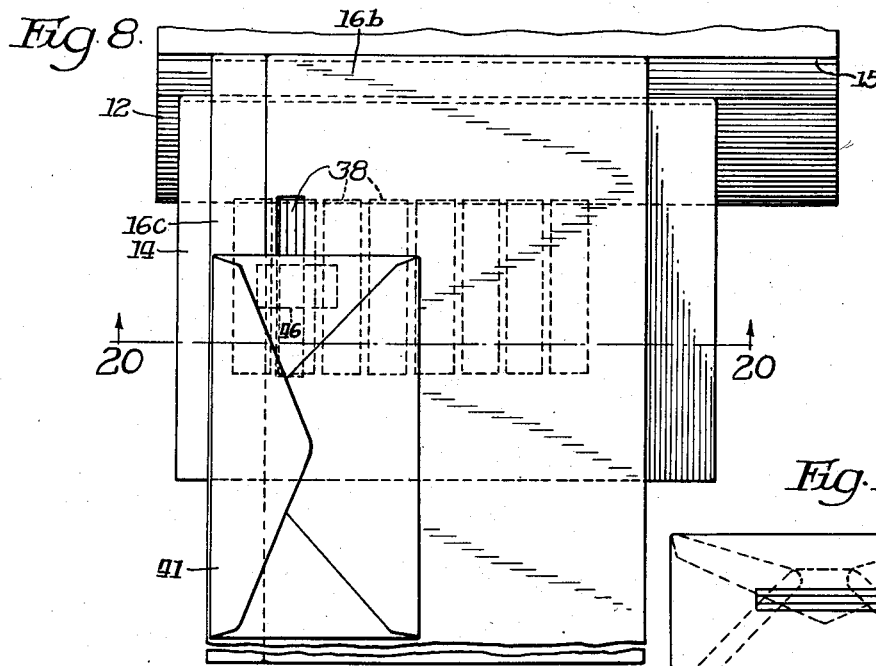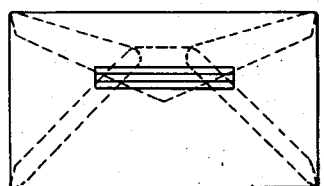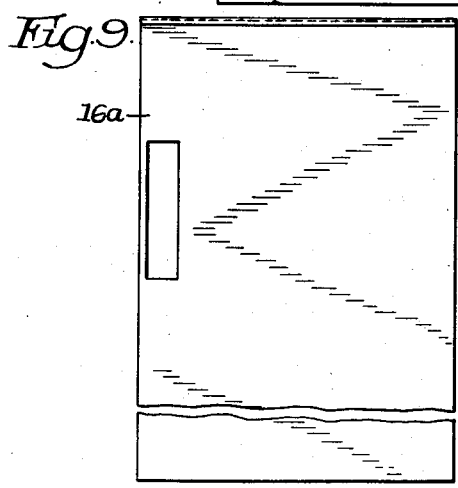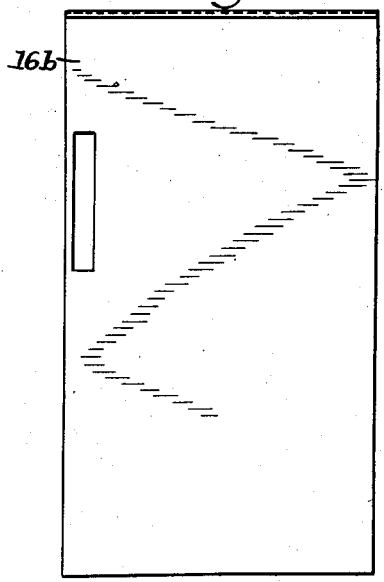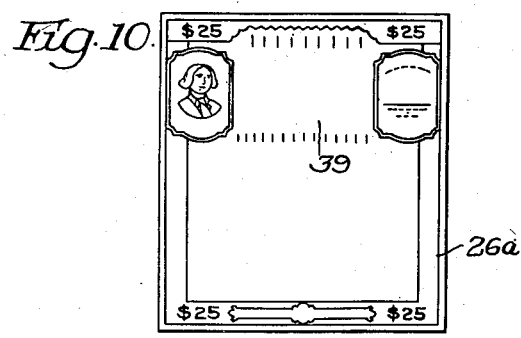

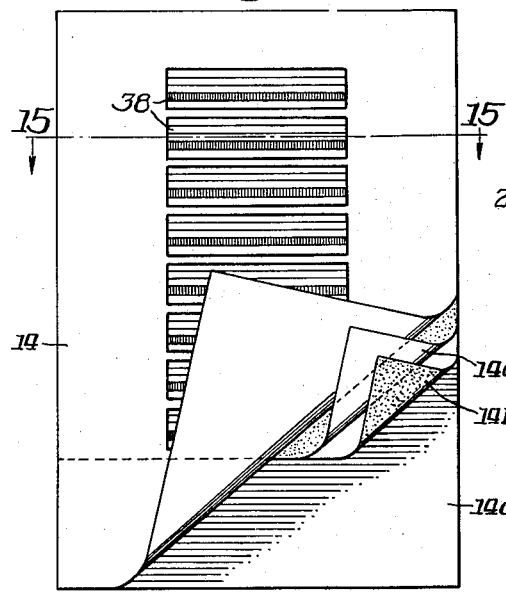
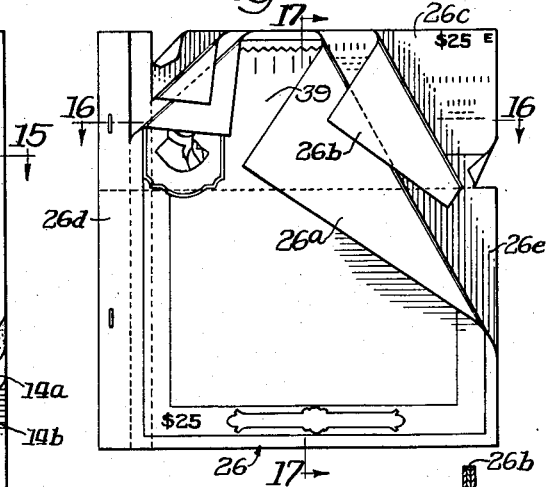
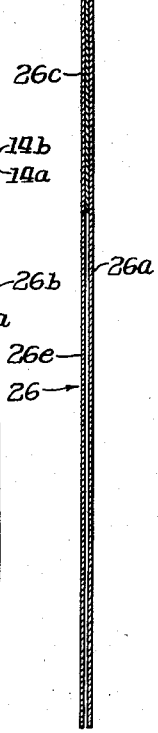
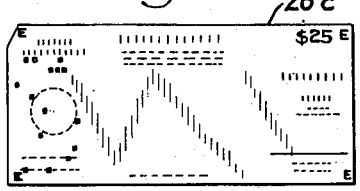
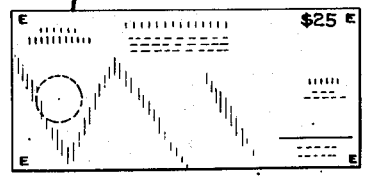
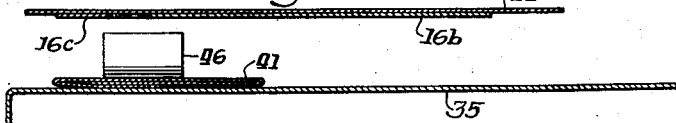

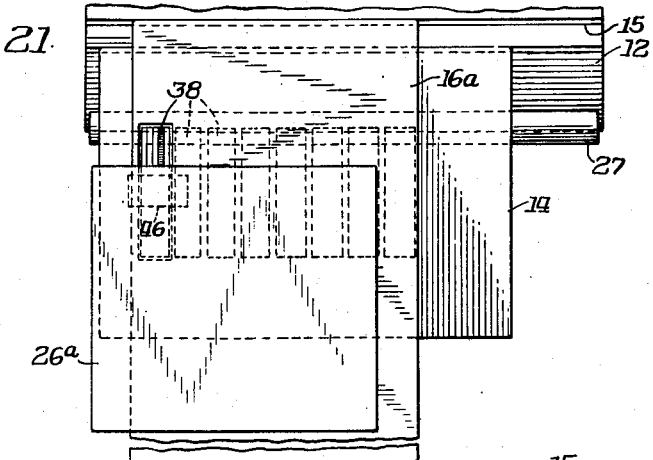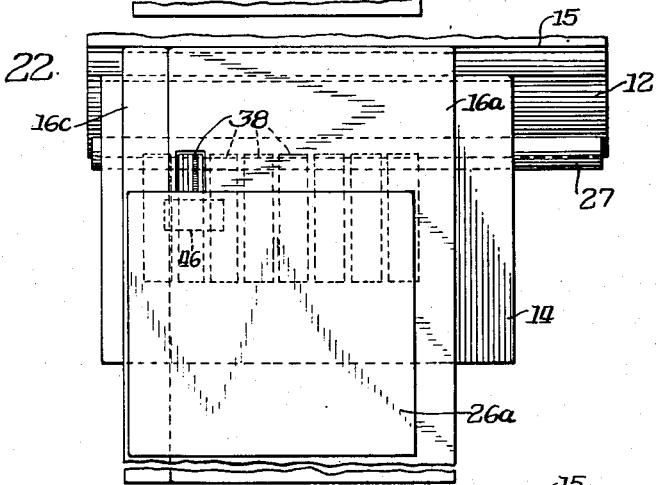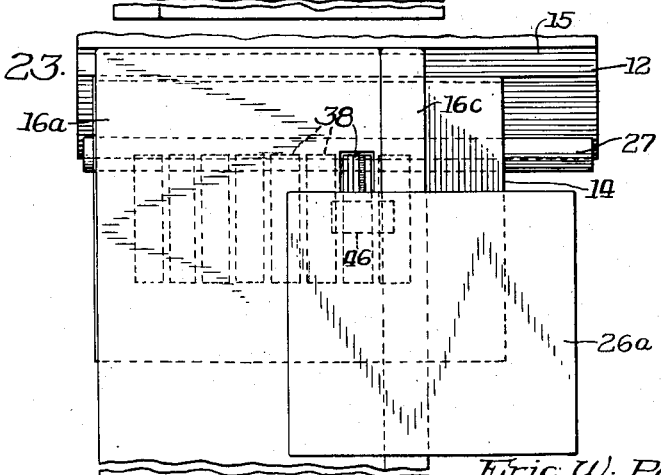

Patented Sept. 20, 1949

2,482,636

UNITED STATES PATENT OFFICE 2,482,636

COATING AND MOISTENING MECHANISM FOR DUPLICATING APPARATUS

Eric W. Peterson, Muskegon, Mich., and John J. Camphouse, Oak Park, Ill., assignors to Ditto, Incorporated, Chicago, Ill., a corporation of West Virginia Original application July 23, 1942, Serial No. 452,022. Divided and this application March 23, 1946, Serial No. 656,698

15 Claims. (Cl. 91—50)

Our invention relates to duplicating apparatus, and more particularly to means of duplication adapted to take copies of selective brightness from a master copy by applying to selective portions of a copy sheet a coating additional to or different from that applied by the usual moistening mechanism. This is a division of our application for patent on Duplicating apparatus, Serial No. 452,022, filed July 23, 1942, now abandoned. The invention is particularly applicable to the making of copies upon rag stock and so-called bond paper in such a manner as to produce fadeproof, bright and sharp characters. One form of the invention is embodied in a duplicating apparatus of the general type shown in application Serial No. 403,355, filed July 21, 1941 by Stephen Kokay, now Patent No. 2,337,721, issued December 28, 1943, and the improved apparatus of the present invention comprises additional elements which are applied to the apparatus shown in the aforesaid application, these additional elements serving to enable the operator to apply a controlled amount of a coating, either liquid or otherwise, to a copy sheet in advance of its moistening by the moistening means of the duplicating apparatus.

The duplicating apparatus embodies a rotary drum having means thereon for attaching a master copy thereto and having means for releasably holding block-out sheets in position to be interposed between the master copy and copy sheets which are moistened and then brought into engagement with the master copy on the drum. A separate mechanism particularly adapted for applying a moistening fluid of a special character to the copy sheet is mounted in advance of the moistening means of the standard duplicating apparatus in such fashion that it may be thrown into operation at the will of the operator and stepped from one position to another lengthwise of the drum in order selectively to apply its fluid to a particular portion of the copy sheet without interfering with the application of the moistening fluid to the whole of the copy sheet by the usual moistening means.

The objects and advantages of the invention will appear more fully as the description proceeds, reference being had to the accompanying drawings wherein a preferred form of the invention is shown. It should be understood, however, that the drawings and description are illustrative only and should not be taken as limiting the invention, except insofar as it is limited by the claims.

In the drawings:

Fig. 3 is an enlarged fragmentary sectional view showing the parts that are in section in Fig. 1 on an enlarged scale;

Fig. 4 is a fragmentary sectional view taken on the line 4—4 of Fig. 1;

Fig. 5 is a sectional view taken on the line 5—5 of Fig. 4;

Fig. 6 is a sectional view taken on the line 6—6 of Fig. 1;

Fig. 7 is a sectional view taken on the line 7—7 of Fig. 1;

Fig. 8 is a somewhat diagrammatic view illustrating the position of the master copy sheet, block-out sheets and a copy sheet (an envelope), looking upwardly from beneath it to illustrate the relative position of the parts at the beginning of the duplicating operation;

Fig. 9 is a plan view of a block-out sheet;

Fig. 10 is a plan view of a copy sheet such as would require special treatment, the sheet shown being a simulation of a bond such as a defense bond;

Fig. 11 illustrates, upon an envelope, the position in which copy would be applied by the arrangement shown in Fig. 8;

Fig. 12 is a view similar to Fig. 9 showing a slightly different form of block-out sheet;

Fig. 13 is a diagrammatic view showing a master copy set such as would be used in the apparatus embodying the present invention;

Fig. 14 illustrates a standard form of defense bond set to which the present invention is particularly applicable;

Fig. 15 is a sectional view taken on the line 15—15 of Fig. 13;

Fig. 16 is a sectional view taken on the line 16—16 of Fig. 14;

Fig. 17 is a sectional view taken on the line 17—17 of Fig. 14;

Fig. 18 is a plan view of a portion of the defense bond set;

Fig. 19 is a plan view of another portion of the defense bond set;

Fig. 20 is a sectional view taken substantially on the line 20—20 of Fig. 8;

Fig. 21 is a diagrammatic view similar to Fig. 13 illustrating one step of the process of duplicating upon a bond;

Fig. 22 is a view similar to Fig. 21 illustrating the relative position of the parts for a duplication upon a second bond; and Fig. 23 is a similar view to Figs. 21 and 22 illustrating the position of the parts for duplication on the last bond of a series to which the information upon the master set is to be applied.

Figure 1:
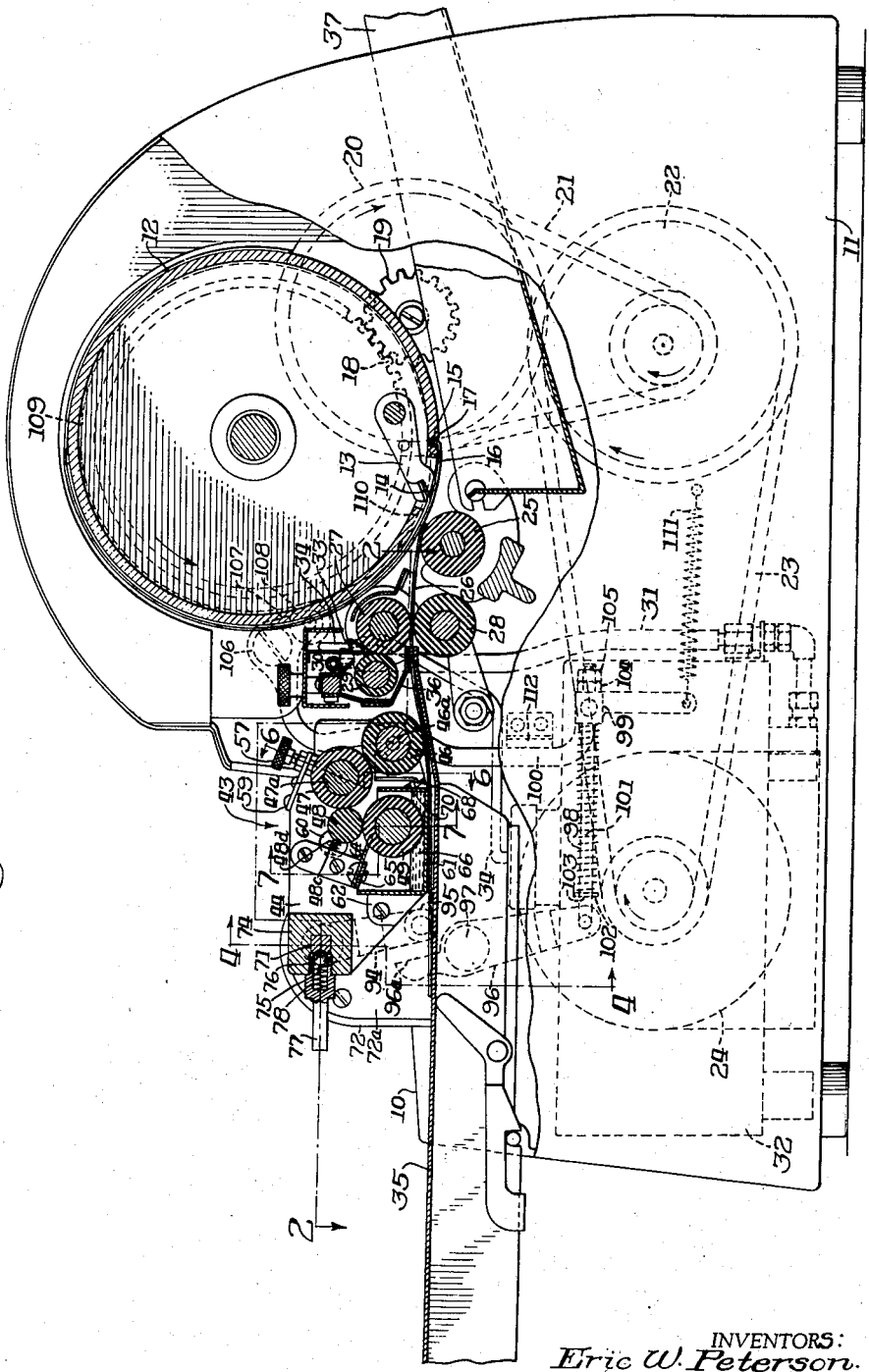
Fig. 1 is a side view partly in section illustrating the duplicating apparatus embodying the invention.

Referring now in detail to the drawings, the present invention is embodied in a duplicating apparatus of the so-called liquid process type wherein a duplicating machine having two side frames 10 and 11 is provided with a duplicating drum 12 that in turn has a gripping mechanism 13 adapted to secure a master copy 14 to the drum. The drum 12 is also provided with a magnetic block-out sheet holding slot 15 in which one or more block-out sheets 16 are movably secured. The details of the magnetic block-out slot are already known. For the purposes of this invention it is sufficient to state that the slot in the drum receives a metallic magnetically attractable strip 17 that is formed on one edge of the block-out sheet 16 and by virtue of the magnetic attraction releasably holds the strip 17 in the slot. The gripping of the strip 17 is sufficient to hold it in place during a normal duplicating operation but it permits the strip to slide lengthwise of the slot under the influence of a comparatively small force applied at the end of the strip.

The duplicating apparatus includes a drive mechanism for rotating the drum 12, this drive mechanism being shown as including a gear 18 operatively connected to the drum, a drive pinion 19 secured to the side frame 10, and a pulley 20 fixed to the pinion 19. The pulley 20 is driven by a belt 21 which in turn is driven by a speed reducing pulley assembly 22 mounted on the frame of the machine, the assembly 22 being driven by a belt 23 from a motor 24. A platen roller 25 is mounted in the machine in position to engage and press a copy sheet 26 against the drum and the sheets thereon as the drum is rotated. A moistening mechanism is provided comprising a moistening roller 27, a counter roller 28 usually of absorbent material adapted to cooperate with the moistening roller in feeding a copy sheet to the drum, and a third roller 29 which cooperates with the moistening roller 27 to pass a limited amount of liquid downwardly between the rollers 27 and 29 so that it may be spread upon the copy sheet. The rollers 27 and 29 are supplied with a liquid from a spray tube 30 which in turn receives the liquid through a conduit 31 from a tank 32 mounted in the frame of the machine. The tank contains a pump (not shown) which is operated in a known manner from the driving mechanism for the drum, and the moistening mechanism includes a suction tube 33 disposed in the trough formed by the rollers 27 and 29 and connected by a conduit 34 to a suction device in the tank 32, all as shown in the prior Kokay application above referred to.

The duplicating apparatus is provided with a feed tray 35 on which the copy sheets 26 are placed and advanced to the rollers 27 and 28. Beneath the roller 29 there is a guard plate 36 which directs the copy sheets to the bite of the rollers 27 and 28. The apparatus is also provided with a receiving tray 37 into which the copy sheets are discharged after having been printed upon by the duplicating machine.

In order that the features of the present invention may be more readily understood, the details of the duplicating operation as directed to the particular problem will now be explained in connection with Figs. 8 to 23, inclusive. The particular operation to which the present invention relates is that of selectably copying upon individual rag stock bonds or like items and their associated record cards specific blocks or lines of information contained upon a master copy. The master copy is shown best in Figs. 13 and 15 as a set which is used in the making out of information for the purposes of issuing bonds and the like. This master set comprises a front sheet 14 of a suitable sheet of paper such as is used for master sheets in liquid process duplication. It will be noted that this sheet has blocked out thereon a multiplicity of information receiving portions 38. Beneath the front sheet 14 there is placed a hectograph carbon sheet 14a with its active face directed toward the sheet 14, and beneath the sheet 14a is a second carbon sheet 14b of record carbon having its active face directed away from the carbon sheet 14a and toward a plain sheet 14c. The operator who is about to make out a series of bonds or who is about to make a master copy from which some other operator can make out a series of bonds takes the master sheet just described and types in the several spaces 38 such information as the name, address and beneficiary of each of several bond purchasers. By this typing operation a master copy in reverse is formed on the back of the sheet 14 by reason of the presence of the hectograph carbon 14a. Likewise a record copy not in reverse is formed on the front surface of the sheet 14c by reason of the presence of the record carbon 14b. After the typewriting operation the record copy 14c and the carbon sheets 14a and 14b are removed from the master copy sheet 14 and this master copy sheet is then ready for use in the duplicating operation.

In Fig. 14 and Figs. 16 to 19, inclusive, the details of a bond set are illustrated. For purposes of this description the bond set 26 will be assumed to be composed of a plurality of copy sheets. The front sheet of the set shown in Fig. 14, indicated by the numeral 26a, is the bond itself and as illustrated in Fig. 10 this bond sheet has a space 39 in which the information from a single one of the spaces 38 is to be reproduced. These bond sheets, since they are to last a long time and are to be subjected often times to rather careless handling, are made of a tough paper capable of withstanding long hard usage. Rag stock is usually used for this type of paper and the bond of course is printed with various insignia and decorations as well as specific detailed information that is common to all bonds of a series or group. In addition for the purposes of record keeping there are included with the bond sheet 26a two record cards 26b and 26c, which record cards are adapted to be used in sorting machines or other recording devices, and these record cards must also receive at least a part of the information and usually all of the information contained in one of the spaces 38 on the master copy sheet 14. As shown, the three sheets 26a, 26b and 26c make up a set all connected to a common edge portion 26d and perforated at the connection so that they can be readily separated from the connecting portion 26d. A backing sheet 26e is also formed integrally with the record card 26c but is separable therefrom by a line of perforations as illustrated in Fig. 14.

On order to utilize the duplicating aparataus in making the necessary entries upon the several sheets and upon an envelope 41 (see Fig. 8) in which the bond may be mailed, the duplicating apparatus operator will place a master sheet 14 in position on the drum 12 of the duplicating machine so that one side edge thereof is clamped in the gripping mechanism 13 to lie in the position shown in Fig. 8. The block-out sheet 16b is secured in place and for the first envelope to be run this block-out sheet 16b is placed in the same position as that in which the block-out sheet 16a is shown in Fig. 21 for the first copy. The envelope 41 is then fed to the duplicating apparatus where it will be moistened by the moistening roller 27, and the narrow opening provided in the block-out sheet 16b will permit a copy to be made of the name and address of the person to whom the bond is being issued on the envelope. The several envelopes corresponding to a number of spaces 38 on the master copy sheet 14 may thus be provided with the names and addresses by the simple expedient of advancing the block-out sheet 16b lengthwise of the drum until all of the copies are made. It is necessary in order to be able to utilize the full available length of the master copy sheet 14 to utilize, in certain conditions, a small auxiliary block-out sheet 16c that protects the master copy sheet 14 from engagement with the moistened envelope 41 where this envelope projects over the side edge of the block-out sheet 16b. However, where the length of the drum permits the use of a wider block-out sheet 16b the use of the narrow block-out sheet 16c may be eliminated.

In the copying of the information on the bond itself and the associated record cards the block-out sheet 16a is used and the mechanical operations are essentially as shown in Figs. 21, 22 and 23; that is, initially the block-out sheet 16a is placed over the master copy sheet 14 in such position that its window exposes the top one of the spaces 38 as shown in Fig. 21 and a bond 26a is detached from its connecting portion 26d and fed through the moistening mechanism so as to receive in the space 39 thereof the name, address and beneficiary of the purchaser of the bond. The block-out sheet 16a has to be moved to expose the next space 38 for the next bond, but before the block-out sheet 16a is moved the two record cards 26b and 26c are detached from their connecting portion 26d and receive their copy so that there is no danger of getting the wrong name and address upon a record card that is already printed with a serial number corresponding to the bond. The next bond is then placed in such position as to receive an imprint from the second space 38, the block-out sheet 16a being moved along the slot lengthwise of the drum to uncover the second space 38. When the block-out sheet 16a is advanced to uncover the second space 38 it becomes necessary, in instances where the length of the drum of the duplicating machine would not permit the use of a wider block-out sheet, to use the small block-out sheet 16c as shown in Fig. 22 to protect the bond itself from receiving an imprint from the first space 38 of the master copy sheet.

The bonds and the record cards are thus imprinted until copies have been made of all the names and addresses, etc. found in the spaces 38. As the lower spaces are approached it is sometimes found that the length of the duplicating drum is insufficient to permit the block-out sheet to move far enough to the right, as viewed in Figs. 21 to 23. In such case the block-out sheet is merely turned over and in order to protect the bond itself the small block-out sheet 16c is placed to the right of the larger sheet 16a as shown in Fig. 23 so as to protect the bond from the imprint of the last space 38. Naturally if more than one space is uncovered by reversal of the block-out sheet 16a a wider block-out sheet 16c can be used to insure protection of the bond.

With the foregoing description of the duplicating operation it will be appreciated that in order to treat the bond and where necessary the record cards with special materials to enable bright, fadeproof and clean-cut copies to be made it may be necessary to specially treat that particular portion of the bond on which the copy is to be made. In the present apparatus a special treating unit 43 is mounted over the feed tray 35 in advance of the moistening rollers 27 and 28. This apparatus 43 comprises two side frames 44 and 45 in which are mounted a series of rollers 46, 47, 48 and 49. The roller 46 is mounted on a shaft 46a that is directly journaled in the side frames 44 and 45. The roller 47 has its shaft 47a journaled in two bearings 50 and 51 which ride in two slots 52 and 53 provided in the side frames 44 and 45 (see Fig. 6). The bearings 50 and 51 are spring pressed downwardly by means of two springs 54 and 55 and the tension on these springs is adjustable by means of two adjusting screws 56 and 57 threaded through two bars 58 and 59 that extend over the slots 52 and 53, the bars of course being secured in place on the side frames 44 and 45. The roller 48 is spring mounted. It has its shaft 48a mounted in bearing blocks 48b, one of which is shown in Fig. 3. These bearing blocks are provided with pins 48c that serve as guides for springs 48d. The bearing blocks 48b and the springs 48d fit in openings 60 that are cut in the side frames 44 and 45, the openings being keyhole shaped so as to provide guides for the blocks 48b. It will be observed from an inspection of Fig. 3 that if the roller 47 is pressed downwardly it tends to move the roller 48 back against the tension of the springs 48d, but the springs 48d permit the bearing blocks 48b to adjust themselves so as to maintain the proper tension between the rollers 47, 48 and 49.

The roller 49 is mounted inside a receptacle 61 that has suitable flanges 62 and 63 fastened to the side frames 44 and 45. This receptacle has a shield and wiper 64 extending across the top thereof and adapted to engage the roller 49. The shield 64 is mounted on a U-shaped bracket 65 that is fastened to the side frames 44 and 45 (see Fig. 7). A special treating material, usually a liquid, is placed in the receptacle 61 and is indicated in Figs. 1 and 7 by the numeral 66. The front end of the receptacle 61 is supported by two spring catches 67 and 68 that engage lugs 69 and 70 provided on the front of the receptacle, the spring catches 67 and 68 being fastened to the side frames 45 and 44, respectively.

Figure 2:
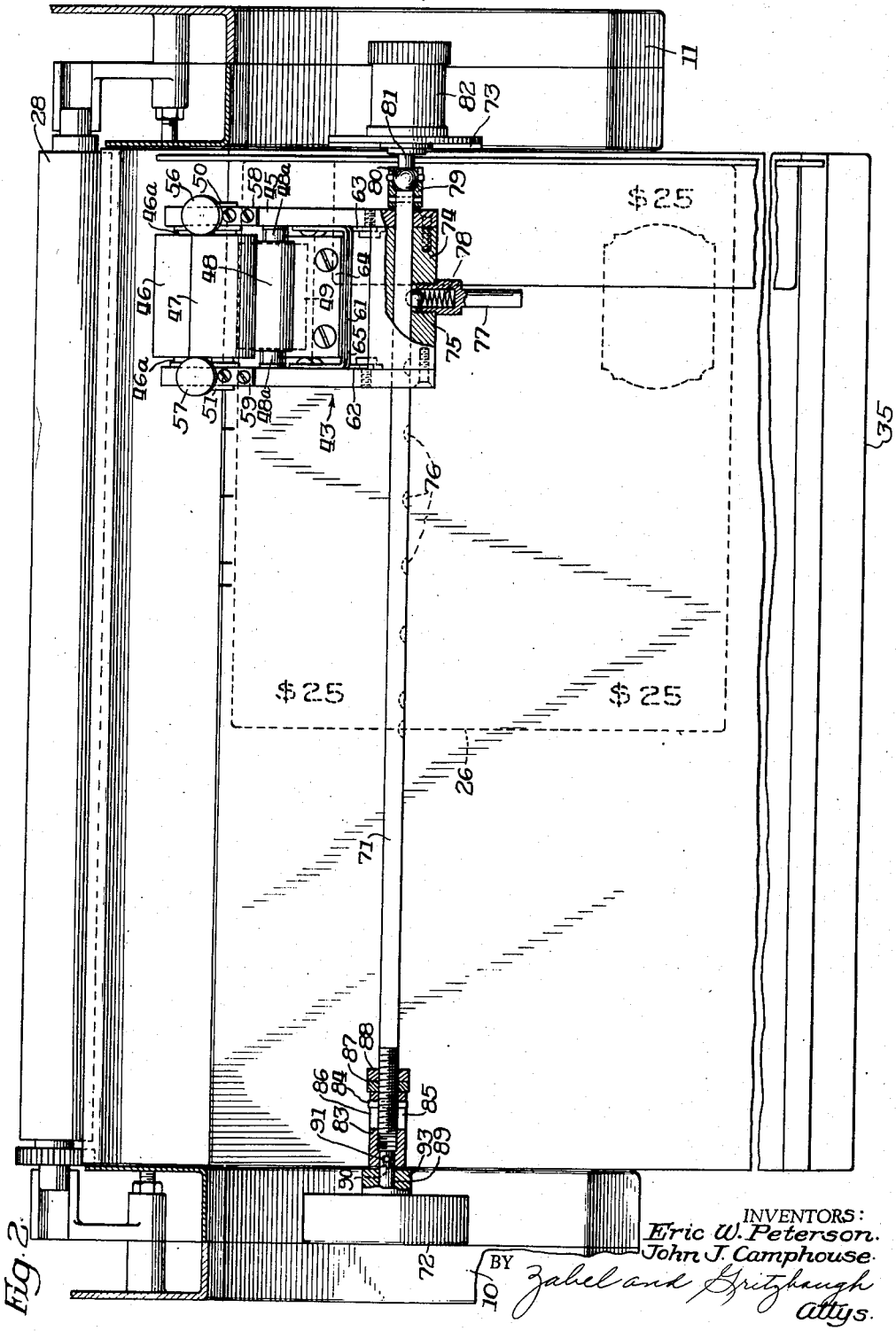
Fig. 2 is a plan view partly in section and on an enlarged scale taken substantially on the line 2—2 of Fig. 1.

The entire device 43 is carried upon a cross bar 71 (see Figs. 2 to 5, inclusive). This cross bar is provided with a square section intermediate its ends and its ends are supported in upstanding frame portions 72 and 73 that are fastened on the side frames 10 and 11. The bar 71 slidably receives a block 74 that is secured to the side frames 44 and 45 and this block is provided with a spring pressed detent 75 that is adapted to engage recesses 76 provided at spaced intervals along the bar 71. A handle 77 serves as a housing for a spring 78 that presses the detent 75 inward. The bar 71 at its right-hand end, as viewed in Fig. 2, is supported by a connecting block 79 that connects to a head 80 on the shaft 81 that is rotatably mounted in the frame portion 73. A knurled hand piece 82 is also fixed to the shaft 81 so that by rotating the hand piece 82 the bar 71 can be turned to raise or lower the device 43. At the other end of the bar 71 means are provided whereby the bar can be operated directly from the drum so as to lower the device 43 into operative position at the proper time and to lift it out of the way in order that copy sheets may be fed beneath the roller 46. The mechanism by which the bar 71 is operatively connected to the drum comprises a connecting block 83 (see Figs. 2 and 4). This connecting block is tubular and the end of the bar 71 extends into the connecting block. A pin 84 in the end of the bar 71 rides in two slots 85 and 86 provided in the block 83. The connection between the bar 71 and the block 83 is made rigid by a nut 87 threaded on the bar 71 and a lock-nut 88 for holding the nut 87 in place. It will be evident that when the nut 87 is tightened the end of the block 83 is clamped between the pin 84 and the nut 87. At its other end the block 83 receives a connecting shaft 89 and the block itself is slotted, as indicated at 90 (see Fig. 4), to receive a pin 91 that is fastened in the shaft 89. The shaft 89 extends into a housing made up of the frame member 72 and a face plate 72a. Suitable bearings 92 and 93 are provided for the shaft 89, these bearings being mounted in the members 72 and 72a. A lever 94 is fixed to the shaft 89 and extends downwardly therefrom. This lever is provided with a roller 95 at its lower end.

An actuating lever 96 is pivoted on a stub shaft 97 fastened to the lower end of the plate 72a and extends downwardly below the stub shaft 97 where it connects to an operating bar 98. The operating bar 98 extends through a cross head 99 that is fastened to a cam lever 100. A coil spring 101 is mounted on the bar 98 between a washer 102 which bears against a cotter pin 103 secured in the bar 98 near the lever 96 and the cross head 99. The end of the bar 98 extends through the cross head and is free to slide therein against the tension of the spring 101. The nut 104 and a lock-nut 105 are threaded onto the end of the bar 98 that passes through the cross head 99. The cam lever 100 is pivoted on the side frame 10 by a stub shaft 106. The cam lever has a short arm 107 that carries a cam roller 108 at its free end. This cam roller rides upon a cam 109 and rotates with the drum. The cam 109 is provided with a raised portion 110. A coiled spring 111 connected between the lower end of the lever 100 and a fixed portion of the framework normally holds the lever turned to the limit of its motion into engagement with a stop block 112, as shown in Fig. 5.

The operation of the mechanism just described to raise and lower the roller 46 is as follows: As the drum approaches home position as shown in Fig. 3 the raised portion 110 of the cam 109 engages the roller 108 to rock the lever 100 in a clockwise direction about its pivot 106. This in turn moves the cross head 99 to the left and due to the heavy spring 101 this causes the bar 98 to move to the left and turn the lever 96 in a clockwise direction about its pivot. The upper end 96a of the lever 96 presses on the roller 95 so as to rock the lever 94 in a counterclockwise direction which in turn turns the cross bar 71 in a direction to lift the device 43 to the position shown in Fig. 3. In this position the roller 46 rises above the feed tray 35 so that the copy sheet may pass beneath it. When the actual duplicating operation starts the roller 108 moves off the high spot 110 of the cam 109 and this allows the member 43 to drop until the roller 46 engages the copy sheet. The copy sheet itself then serves as the mechanism for rotating the roller 46 so that in turn the rollers 47, 48 and 49 are rotated to feed liquid onto the roller 46 and thus moisten the top of a copy sheet. It will be noted that there is considerable delay in this feeding operation and for this purpose it is advisable to prime the roller 46 at the start of a series of duplicating operations in order that the roller may have an adequate supply of liquid. If it is desired to render the device 43 inoperative it is turned back by means of the hand piece 82 and thus held out of the way. The hand piece 82 desirably contains an interlocking mechanism (not shown) by which it can be locked in position to hold the device 43 raised. It will be noted that when the device 43 is raised the lever 94 will be moved out of the way of the lever 96 so that the continued operation of this lever by the actuation of the drum will have no effect.

As an example of the type of treatment that is employed by means of the apparatus just described it has been found that by the use of a bentonite and special dye solvent solution exceedingly bright and fadeproof copies can be made on rag stock, bond paper and the like. We therefore use this type of solution in the receptacle 61 and the solution is applied selectively only to that part of the bond that is going to receive the copy from the master sheet. It is thus possible to utilize the duplicating apparatus in normal manner for normal copy work on copy sheets that are of the usual copy paper, and whenever it is desired to make a particular part of the copy stand out the device 43 is lowered into position to apply its special solution to that part of the copy sheet that is to receive the bright appearing copy.

From the above description it is believed that the features and advantages of our invention will be readily apparent to those skilled in this art.

We claim:

1. In a duplicating apparatus, the combination of sheet moistening forwarding means extending across transversely of the machine for forwarding and moistening sheets one at a time, and means adjustable transversely of the machine adapted when in operative position to apply a coating to a selected portion of one face of a sheet being carried forwardly by said forwarding means before said portion engages said forwarding means.

2. In a duplicating apparatus, the combination of sheet moistening forwarding means extending across transversely of the machine for forwarding and moistening sheets one at a time, and means comparatively much narrower than the machine and adjustable transversely of the machine adapted when in operative position to apply a coating to a comparatively narrow portion of one face of a sheet being carried forwardly by said forwarding means before said portion engages said forwarding means.

3. In a duplicating apparatus, the combination of two cooperating forwarding rollers extending across transversely of the machine for forwarding sheets one at a time, means comprising a comparatively much shorter roller adjustable transversely of the machine adapted when in operative position to apply a coating to a comparatively narrow portion of one face of a sheet being carried forwardly by said forwarding rollers, and means for moving said shorter roller out of operative position to permit feeding of sheets to said forwarding means without engagement of said shorter roller therewith.

4. In a duplicating apparatus, the combination of two cooperating forwarding rollers extending across transversely of the machine for forwarding sheets one at a time, means comprising a comparatively much shorter roller movable between a raised inoperative position and a lowered operative position and adjustable transversely of the machine adapted when in operative lowered position to apply a coating to a comparatively narrow portion of the top face of a sheet being carried forwardly by said forwarding rollers, and means for moving said shorter roller out of operative position to permit feeding of sheets to said forwarding means without engagement of said shorter roller therewith.

5. In a duplicating apparatus, the combination of a sheet moistening forwarding means extending across transversely of the machine for forwarding and moistening sheets one at a time, means comparatively much narrower than the machine and adjustable transversely of the machine adapted when in operative position to apply a coating to a comparatively narrow portion of one face of a sheet being carried forwardly by said forwarding means before said portion engages said forwarding means, and readily releasable means adapted normally to hold said coating means in any of a plurality of different adjusted positions transversely of the machine.

6. In a duplicating apparatus, the combination of a sheet forwarding means extending across transversely of the machine for forwarding sheets one at a time, a rock bar extending across to the rear of said sheet forwarding means, means carried by said rock bar for giving the bar a slight rotary movement, a coating mechanism comparatively much narrower than the machine mounted on said rock bar so as to rock therewith but so as to be slidable transversely of the machine on the bar and adapted when in lowered operative position to apply a coating to a comparatively narrow portion of the face of a sheet being carried forwardly by said forwarding means before engagement of said body portion with said forwarding means, and readily releasable means for connecting said coating mechanism releasably with said bar for holding the coating mechanism in a fixed adjusted position on said rock bar transversely of the machine, said connecting means being unaffected by rocking movements of said bar.

7. In a duplicating apparatus, the combination of a sheet moistening forwarding means extending across transversely of the machine for forwarding and moistening sheets one at a time, a rock bar extending across to the rear of said sheet forwarding means, a coating mechanism comparatively much narrower than the machine mounted on said rock bar so as to rock therewith but so as to be slidable transversely of the machine on the bar and adapted when in lowered operative position to apply a coating to a comparatively narrow portion of the face of a sheet being carried forwardly by said forwarding means before said portion engages said forwarding means, and means actuated at timed intervals in the operation of the machine for rocking said rock bar for moving said coating mechanism upwardly out of operative position so as to permit a copy sheet to be inserted readily underneath said coating mechanism.

8. In a duplicating apparatus, the combination of a sheet forwarding means extending transversely of the machine for forwarding sheets one at a time, a rock bar extending across to the rear of said sheet forwarding means, a coating mechanism comparatively much narrower than the machine mounted on said rock bar so as to rock therewith but so as to be slidable transversely of the machine on the bar and adapted when in lowered operative position to apply a coating to a comparatively narrow portion of the face of a sheet being carried forwardly by said forwarding means, means comprising a lever for moving said coating mechanism upwardly out of operative position so as to permit a copy sheet to be inserted readily underneath said coating mechanism, means comprising a cam driven in timed relation with the machine for moving said lever to a position to move said coating mechanism upwardly out of operative position, yielding means engaging said lever to normally hold said lever in the position corresponding to the lowered operative position of said coating mechanism, and other yielding means in the connections between said lever and said coating mechanism for cushioning the action of said cam on said coating mechanism.

9. In a duplicating apparatus, the combination of a sheet forwarding means extending across transversely of the machine for forwarding sheets one at a time, a rock shaft extending across to the rear of said sheet forwarding means, two plates slidably mounted on said rock shaft and extending forwardly therefrom, a short roller rotatably mounted between said plates, a tank mounted between said plates to the rear of said short roller, a second roller rotatably mounted between said plates in position to pick up a supply of liquid from said tank, and means for transferring a film of liquid from said second roller to said first-named roller for application to the top face of a sheet being carried forwardly by said forwarding means, all said rollers and said tank being mounted forwardly of said rock shaft.

10. In a duplicating apparatus, the combination of a sheet forwarding means extending across transversely of the machine for forwarding sheets one at a time, a rock shaft extending across to the rear of said sheet forwarding means, two plates slidably mounted on said rock shaft and extending forwardly therefrom, a short roller rotatably mounted between said plates, a tank mounted between said plates to the rear of said short roller, a second roller rotatably mounted between said plates in position to pick up a supply of liquid from said tank, a third roller rotatably mounted in position to engage said first-named roller and movable downwardly and backwardly with respect thereto, a fourth roller rotatably mounted in position to engage said second and third rollers and movable downwardly and forwardly with respect thereto, and yielding means for pressing said third and fourth rollers yieldingly downwardly for controlling the thickness of the film of liquid applied to said first-named roller.

11. A device for applying a special fadeproof liquid to copy sheets for liquid process duplication, comprising two plates, a roller rotatably mounted between said plates, a tank mounted between said plates adjacent to said roller, a second roller rotatably mounted between said plates in position to turn in and pick up liquid in said tank, and means for transferring a film of liquid from said second roller to said first-named roller for application to a copy sheet engaging said first named roller, said tank being pivoted to the side plates for downward swinging movement about its pivots, and a spring catch releasably holding said tank in raised position.

12. A device for applying a special fadeproof liquid to copy sheets for liquid process duplication, comprising two plates, a roller rotatably mounted between said plates, a tank mounted between said plates adjacent to said roller, a second roller rotatably mounted between said plates in position to turn in and pick up liquid in said tank, and means for transferring a film of liquid from said second roller to said first-named roller, a rock shaft at one end of said plates and supporting them, a support for said rock shaft, and means to turn said shaft whereby to raise and lower the plates and the tank and rollers carried thereby, said first named roller engaging a copy sheet to apply a film of liquid thereto in the lowered position of said plates only.

13. A device for applying a special fadeproof liquid to copy sheets for liquid process duplication, comprising two plates, a roller rotatably mounted between said plates, a tank mounted between said plates adjacent to said roller, a second roller rotatably mounted between said plates in position to turn in and pick up liquid in said tank, and means for transferring a film of liquid from said second roller to said first-named roller, a rock shaft at one end of said plates and supporting them, a support for said rock shaft, and means to turn said shaft whereby to raise and lower the plates and the tank and rollers carried thereby, said plates being adjustable lengthwise of the rock shaft, said first named roller engaging a copy sheet to apply a film of liquid thereto in the lowered position of said plates only.

14. A device for applying a special fadeproof liquid to copy sheets for liquid process duplication, comprising two plates, a roller rotatably mounted between said plates, a tank mounted between said plates adjacent to said roller, a second roller rotatably mounted between said plates in position to turn in and pick up liquid in said tank, and means for transferring a film of liquid from said second roller to said first named roller for application to a copy sheet engaging said first named roller, said means comprising two spring pressed rollers adjustable in different planes toward and away from the first named rollers.

15. In a duplicating apparatus, the combination of sheet forwarding means extending across transversely of the machine for forwarding copy sheets one at a time, means adjacent to said sheet forwarding means adapted when in operative position by engagement with a sheet being carried forwardly by said forwarding means to apply a coating to one face of said sheet, and means actuated by the operation of the machine for moving said coating means periodically into and out of sheet engaging position for first permitting the feed of a copy sheet to said forwarding means without engagement of said coating means therewith and then engaging said coating means with said sheet in timed relation to each duplicating operation, and means for holding said coating means out of sheet engaging position irrespective of the actuation of said means for moving said coating means periodically.

ERIC W. PETERSON.
JOHN J. CAMPHOUSE.

REFERENCES CITED

The following references are of record in the file of this patent:

UNITED STATES PATENTS

| Number | Name | Date |
|---|---|---|
| 402,188 | Peregrine | Apr. 30, 1889 |
| 2,137,096 | Ritzerfeld | Nov. 15, 1938 |
| 2,142,449 | Marchev | Jan. 3, 1939 |
| 2,277,960 | Denison | Mar. 31, 1942 |

FOREIGN PATENTS

| Number | Country | Date |
|---|---|---|
| 421,352 | Great Britain | Dec. 19, 1934 |